Figure 1:
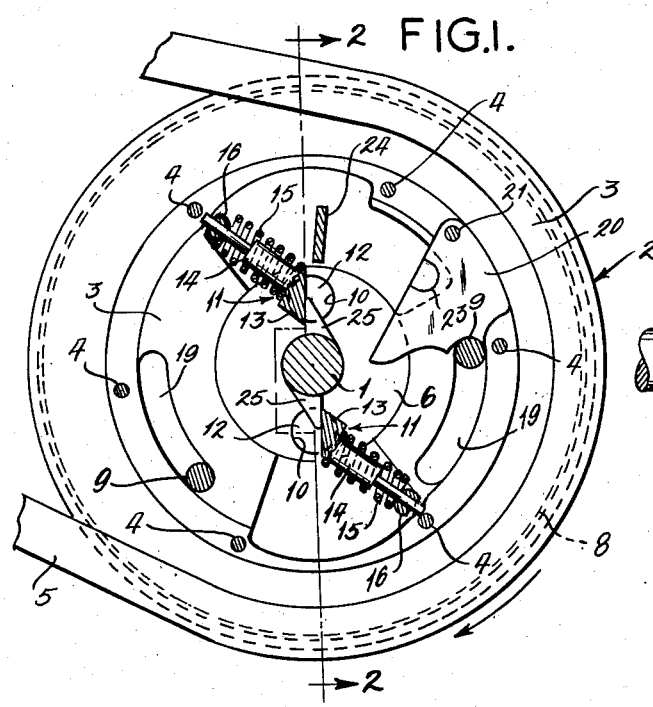

April 8, 1958 E. THOMSON 2,829,749
SHOCK LOAD CLUTCH WITH AUTOMATIC RESET
Filed Aug. 25, 1952 4 Sheets-Sheet 1

INVENTOR:
EDWARD THOMSON
By Gravely, Lieder, Woodruff & Dees
ATTORNEYS.

April 8, 1958     E. THOMSON     2,829,749
SHOCK LOAD CLUTCH WITH AUTOMATIC RESET
Filed Aug. 25, 1952     4 Sheets-Sheet 2

INVENTOR
EDWARD THOMSON
By Grandy, Rieder, Workruff & Rees
ATTORNEYS.

April 8, 1958          E. THOMSON          2,829,749
SHOCK LOAD CLUTCH WITH AUTOMATIC RESET
Filed Aug. 25, 1952          4 Sheets-Sheet 3
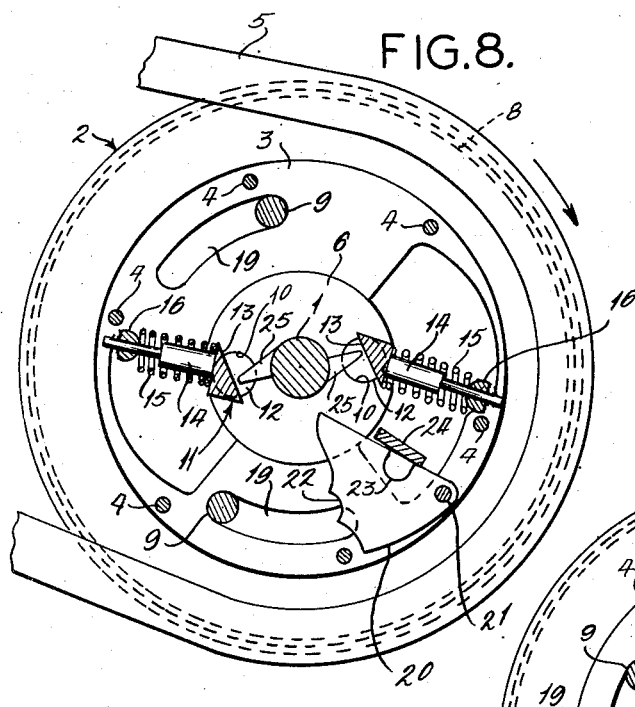
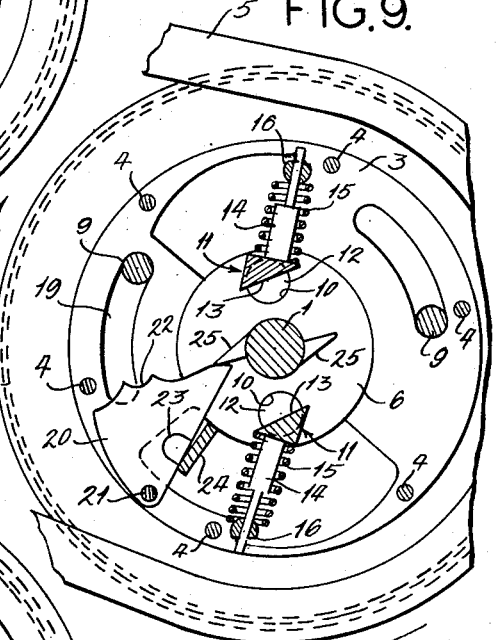
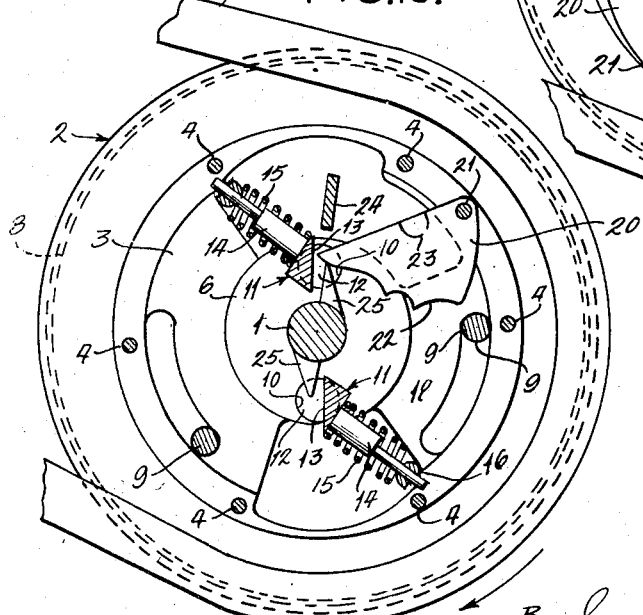
INVENTOR:
EDWARD THOMSON.
By Gravely, Lieder, Woodruff & Hess
ATTORNEYS.

April 8, 1958

E. THOMSON 2,829,749

SHOCK LOAD CLUTCH WITH AUTOMATIC RESET

Filed Aug. 25, 1952

4 Sheets-Sheet 4

INVENTOR
EDWARD THOMSON
By Gravely, Lieder, Woodruff & Heels
ATTORNEYS.

United States Patent Office 2,829,749
Patented Apr. 8, 1958

2,829,749

SHOCK LOAD CLUTCH WITH AUTOMATIC RESET

Edward Thomson, Mount Vernon, Ill.

Application August 25, 1952, Serial No. 306,122

13 Claims. (Cl. 192—56)

This invention is directed to clutches and is more particularly concerned with a clutch that will release when a shock load is applied thereto and that will reset automatically after the cause of the shock load has been removed and following a suitable reduction in the speed of the driving element of the clutch.

The principal object of the invention is to provide a clutch that is releasable when encountering a shock load and having mechanism therein that will cause it to automatically reset after the cause for release has been removed following a suitable reduction in speed of the driving element, thus reducing the out-of-time service of the mechanism in which it is employed.

Another object of the invention is to provide a shock load release clutch which is releasable upon the application of a shock load but which will remain engaged during normal overloads, and contains means for automatically resetting the clutch after the cause of the shock load has been removed and the speed of the driving element thereof has been suitably reduced.

The invention consists in the provision of a clutch having a pawl therein which is engageable with lever mechanism secured to the driven member wherein the driving and driven members will be rotated during normal operation and which includes inertia devices for releasing the pawl and lever when a shock load is imposed on the clutch, the clutch containing a magnetically-controlled lever for assisting in resetting the clutch after the cause for the shock load has been removed and a suitable reduction in speed of the driving member.

Figure 2:
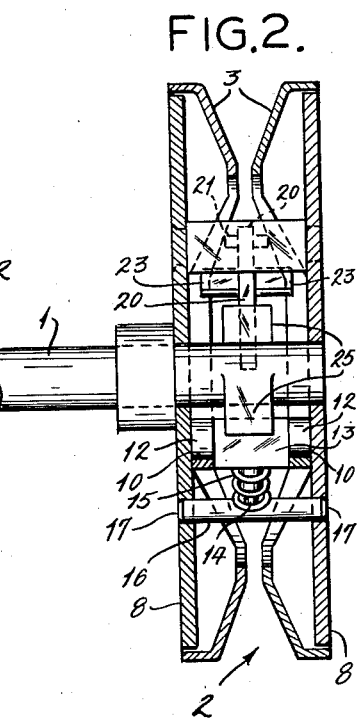
Figure 3:
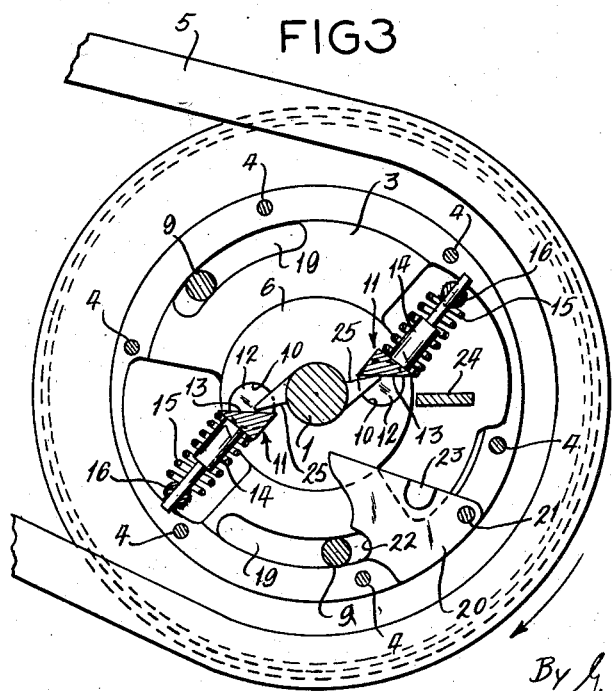
Figure 11:
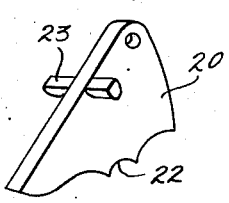
Figure 12:
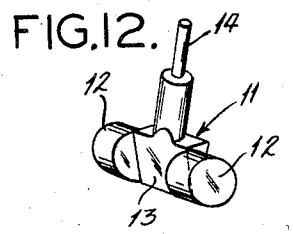
Figure 4:
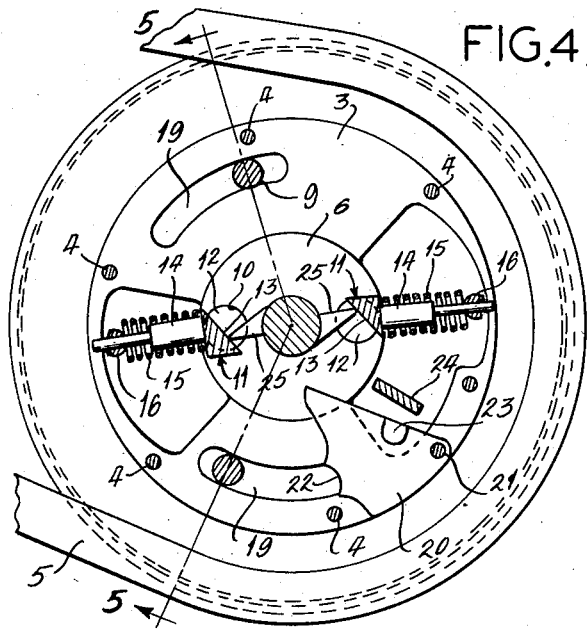
Figure 5:
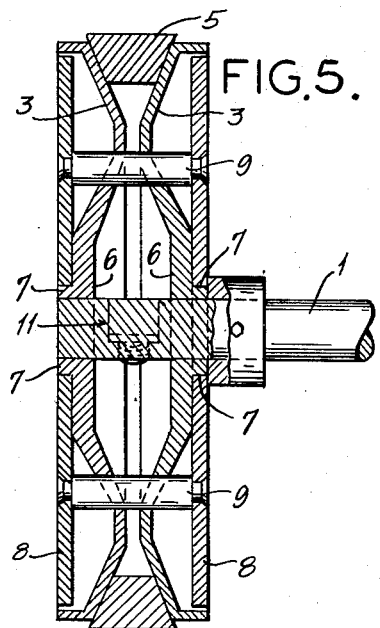
Figure 7:
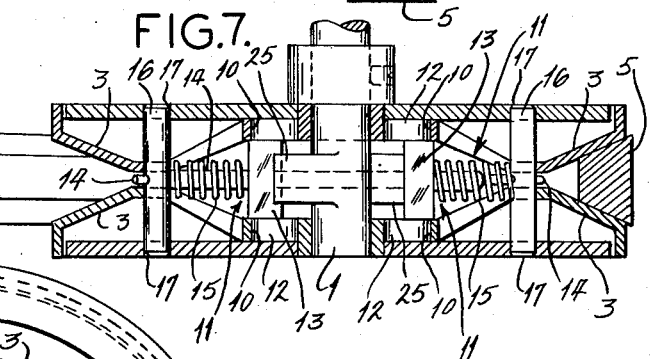
Figure 6:
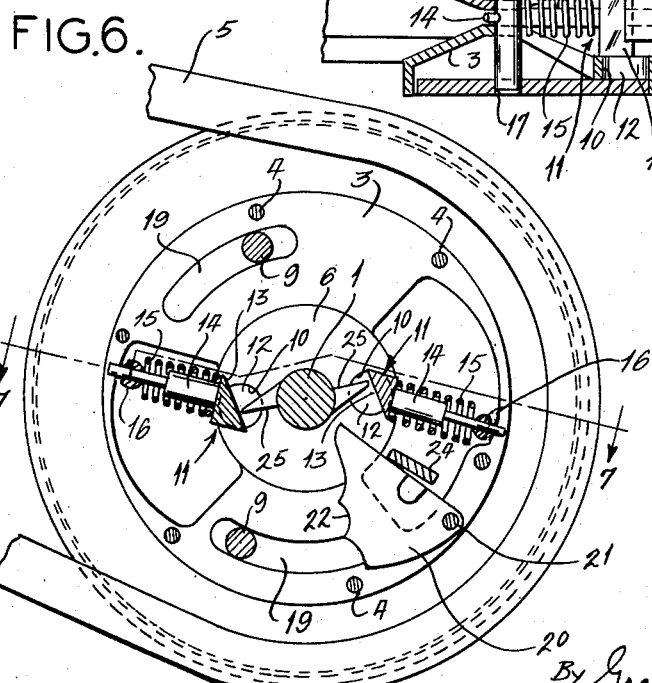
Figure 13:
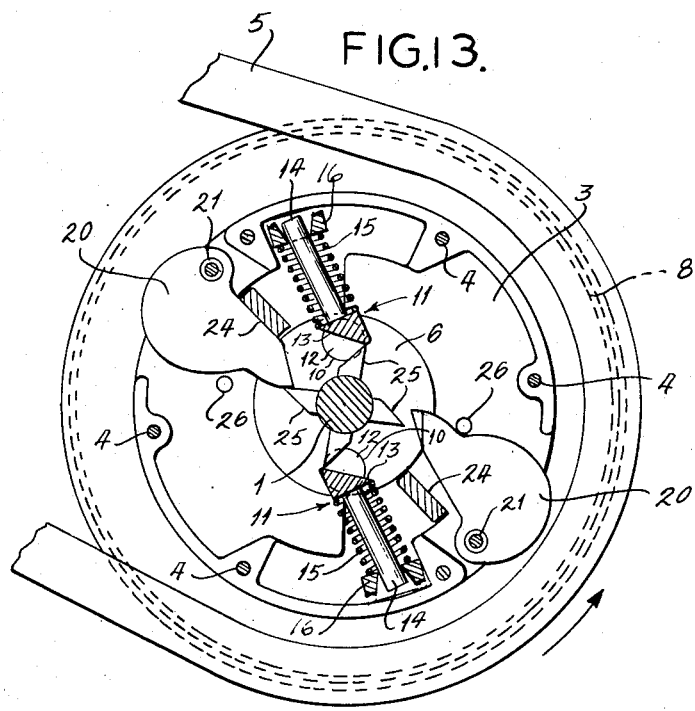
Figure 14:
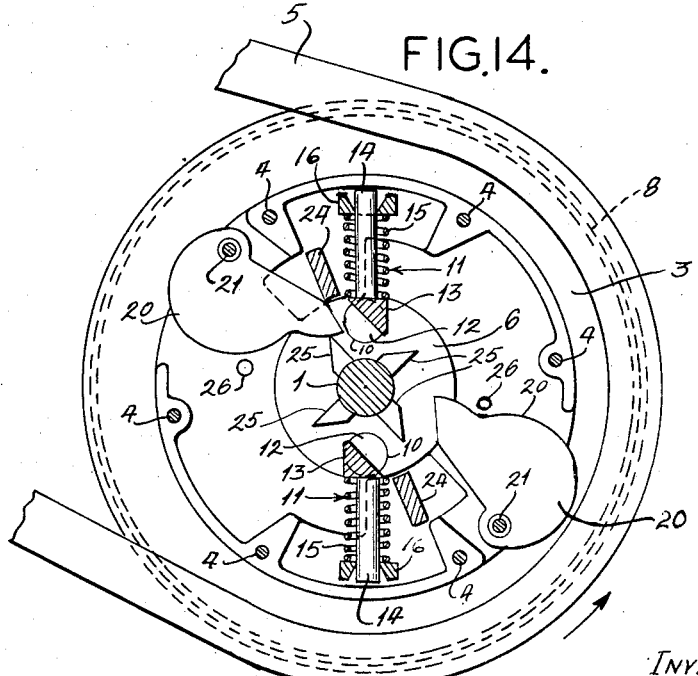

In the drawings:

Fig. 1 is an end view of the clutch, portions being removed to show structural details, Fig. 2 is a sectional view taken along the line 2—2 of Fig. 1, Fig. 3 is a view similar to Fig. 1 showing the position of the parts in their initial stage of shock load, Fig. 4 is a view similar to Fig. 1 wherein parts are shown in position for automatic completion of the clutch release, Fig. 5 is a sectional view taken along the line 5—5 of Fig. 4, Fig. 6 is a view similar to Fig. 1 with parts shown in released positions, Fig. 7 is a view taken substantially along the line 7—7 of Fig. 6, Fig. 8 is a view similar to Fig. 1 showing the initial position of the reset mechanism, Fig. 9 is a view similar to Fig. 8 showing the reset mechanism in partial operation, Fig. 10 is a view similar to Fig. 8 showing the completed operation of the reset mechanism, Fig. 11 is a perspective view of the reset lever, Fig. 12 is a perspective view of the pawl mechanism for the clutch, Fig. 13 is a view similar to Fig. 1 showing a modified form of the invention in de-clutched position, and Fig. 14 is a view similar to Fig. 1 showing the clutch in a different or partially reset position.

The invention is disclosed in the several views of the drawings in which the numeral 1 designates the driven member and 2 the driving member. The driving member comprises a V-shaped pulley made up of two parts 3, the outer peripheral portion thereof being flanged and the adjacent web portion outwardly inclined therefrom to form the V pulley. These parts are secured together by a plurality of fastening means 4 and mounted for rotation on the driven member of the clutch. The driving member also has a V-shaped belt 5 placed thereabout which is connected to a suitable source of power. The inner portions 6 of each of the parts 3 of the driving member 2 are plane radial portions provided with axially extended hubs 7 (Fig. 5) so that the parts may rotate easily relative to the driven member 1. Inertia discs 8 are disposed within the flanges of the driving member and hubs 7 and connected together by means of pins 9 and are capable of rotation on hubs 7 relative to the driving member 2.

Each of the plane inner portions 6 of the driving member 2 is provided with a pair of aligned apertures 10 that are cut therein in which pawls 11 are rotatably mounted. Each pawl is provided with heads 12, rotatably mounted in the apertures 10. A substantially triangular sectioned member 13 is connected between the heads and has a surface substantially radial to the heads but slightly off-center therefrom. A pin 14 is integral with the triangular sectioned member about which a spring 15 is placed. This spring abuts the triangular sectioned member 13 and a transverse pin 16 is slidably received over the small diameter end of pin 14. The ends of the transverse pin 16 are received in apertures 17 (Fig. 2) cut in the inertia discs 8, thus holding the spring under tension. The transverse pin 16 carried by the inertia plates 8 moves the outer end of the pin 14 about the rotational axis of the heads 12 during relative movement of the parts 3 and inertia plates 8, and the heads 12 which are a part of pawls 11 rotate in the apertures 10 formed in the central area 6 of parts 3. The two different axes of rotation, that is the difference in the axis of member 1 and the axis of heads 12 in members 3, produce the energization of springs 15 and the resultant overcenter effect thereof. Arcuate slots 19 are cut in the web of the driving member 2 to receive pins 9 for holding the inertia discs 8 in position on the hubs 7. Thus, the discs are connected together without interfering in the relative movement desired with parts 3 when a change in speed of rotation occurs.

The reset mechanism for the clutch comprises a substantially triangular piece of metal or reset lever 20 pivoted to parts 3 of the driving member 2 by a pin 21. One edge of the triangular metal piece or reset lever has a plane surface, the side opposite pin 21 being notched at 22 for receiving one of the pins 9 during operation of the device for limiting the outward movement (Fig. 4) of the reset lever. Along the straight edge of the triangular piece a small magnet 23 is assembled that is engageable with armature 24 secured to and connected between the inertia discs 8. The lever 20 has its mass so arranged (Fig. 10) that a combination of location of the center of gravity and the eccentric location of the mass willl always result in its return to the outer position, as in Fig. 1. For example (Fig. 10) the mass near notch 22 is farther out radially from member 1 than is the mass at the inner tip contacted by dog 25.

In the operation of the device it is assumed that the direction of rotation of the driving member is in accordance with the arrows appearing in Fig. 1 or clockwise. When a shock load is encountered by the driven member 1, its motion will be actually stopped or momentarily reduced and this will cause a momentary hesitation of the driving member 3. In order for the driving member to continue rotation the inertia discs 8 must release the pawls 11 from dogs 25 which are secured to the driving member 1, thereby breaking the operating connection between members 1 and 3.

This is accomplished when the inertia discs 8 rotate relative to the driving member 3 which is caused when driven member 1 encounters the shock load. When the inertia discs rotate relative to the driving and driven members they will rotate the heads 12 on pawls 11 in the apertures 10 in the plane radial inner portions 6. The rotation of pawl heads 12 is caused by the travel of transverse pin 16 and the free end of pin 14 through their arc about the axis of rotation of inertia discs 8, thereby causing the spring 15 to be energized. During the first one half or necessary range of travel of the pins 16 and 14 spring 15 will be compressed. During the latter half or remainder of the range of travel spring 15 will expand therefore expending its energy for completing the motion of the pins 16 and the free end of pins 14. This produces an overcenter action wherein a spring completes the motion after being energized during the initial range of its operation.

Fig. 3 shows the position of the parts during the initial stages of shock overload wherein the pawls 11 have begun to move relative to the dogs 25 under the action of the inertia discs 8 moving relative to member 3 to ultimately separate or break connection and permit the driving and driven elements to rotate relative to each other.

Fig. 4 shows the position of the parts of the clutch wherein the energy stored in springs 15 is about ready to be released to complete the rotation of the pawls to the position shown, and in Fig. 6 the motion is complete so that the arms or dogs 25 now clear the inner plane surface of the triangular sectioned member 13, thus permitting the driving member to rotate relative to the driven member without restraint. In this position the transverse pin 16 will be located at the opposite side of the slot in which it moves thereby holding the clutch in disengaged position. Centrifugal action will force the reset lever 20 outwardly from the pawls 11 against one of the pins 9 in contact with one of the notches 22 so that relative rotation of the driving and driven members will continue until a condition is reached wherein the reset mechanism will be brought into operation.

The reset mechanism for the clutch cannot re-engage or be brought into operaiton until the speed of the driving member 2 has been reduced to such value that the centrifugal action on the reset lever 20 will permit the latter to start moving radially inwardly about the pin 21. Gravitational action or other means will start this motion so that lever 20 will be disengaged from pin 9 which is the condition precedent to the initiation of the resetting operation.

The reset mechanism is shown in its initial state of operation in Fig. 8 wherein the reset lever has swung radially inward so that magnet 23 can be attracted into engagement with armature 24. The purpose of the magnet and armature is to hold the reset lever radially inwardly during the part of each revolution when it is in the lower portion of its path of travel or at least below the horizontal which is the blind part of each rotation. The pointed end of dogs 25 are shown clearing the inner surface of the triangular section 13 of the pawls 11 in Fig. 8. Continued rotation of the driving member 2 will now bring the pointed end of the reset lever 20 into engagement with one of the dogs 25 on the driven member 1, as shown in Fig. 9.

The pointed end of the reset lever being in engagement with one of the stationary dogs 25 will cause the lever to swing about pin 21. The reset lever being in engagement with armature 24 secured to the inertia members 8, 8 and the driven members 3, 3 being rotated will cause the inertia discs 8, 8 to rotate relative to the driven member. As these members rotate relative to each other the heads of pawls 11 will rotate in parts 3, 3 and the free end of pin 14 and pin 16 will swing reversely to that above described about the axis of rotation of inertia discs 8 energizing springs 15 during the first part of the range of movement and the energized spring completing the relative movement during the latter or final range of the relative movement. This overcenter action is just the reverse of the disengaging action described above and restores the parts to their Fig. 10 position or that shown in Fig. 1. The reset lever 20 will now be moved outwardly by centrifugal action to clear dogs 25, and rotation of the pawls 11 will bring the inner surface of the triangular section thereof into engagement with arms 25, as shown in Fig. 10 thereby causing the driven member 1 to be rotated by driving member 2. The reset lever 20 will now move, by reason of the centrifugal force, to the position (Fig. 1) wherein one of the notches in one rear edge thereof will be re-engaged with one of the pins 9. If the cause for the shock overload has not been removed, the release mechanism will again become operative. It will not be necessary to manually reset the clutch after the cause for the initial shock release thereof has been removed.

A modified form of the invention is disclosed in Figs. 13 and 14 of the drawings. The several parts of the mechanism bear the same reference numerals as in the mechanism discussed above. The reset levers omit the magnet 23 and the part 24 does not function as a magnet armature as in the above described mechanism. The reset levers have the bulk of their mass disposed to one side of the pivot 21 of the levers in order that centrifugal action will more readily swing them outwardly. Two reset levers 20 are provided and four dogs 25 are carried by driven member 1.

Fig. 13 shows the clutch in disengaged position wherein the dogs 25 clear the triangular portion 13 of the pawls 11 whose plane surface assumes a position radially beyond the axis of rotation of the heads 12 as in the disclosure discussed above. When the speed of driving member 2 has been reduced to the point where gravitational action will draw the reset levers 20 radially inward the pointed end thereof will engage one of the dogs 25. The bars 24, there being two instead of one as in the above disclosure, are now engaged by the reset lever. The driven member 1 being at rest and the driving member rotating in the direction indicated will cause reverse relative rotation of the inertia discs with respect to the driving member. This is true because bars 24 are secured to each of the inertia discs 8 and the dogs 25 acting on the reset lever will cause the inertia discs to rotate relative to the driving member 2. Since pawls 11 are secured to the discs 8 by means of pin 16 they will be rotated from the position shown in Fig. 13 to that shown in Fig. 14. During the first part or range of their motion, spring 15 will be energized and during the last part or range of the relative motion, the energized spring will give up its energy to complete the relative motion. Thereafter the reset lever will move outwardly by reason of centrifugal motion into engagement with stops 26 and two of the dogs 25 will engage the angular face of triangular portion 13 of the pawls 11 thus placing the clutch in condition for operation. Fig. 14 shows the condition of the clutch similar to that of Fig. 9 wherein the resetting action is approximately one half completed.

The clutch is disengaged and reset in the same manner described above in connection wtih Figs. 1–12.

One advantage of the modified structure is that it eliminates the sticking of the reset levers by reason of the magnet carried thereby which is preferably an "Alnico" magnet and eliminates the use thereof. Gravitational action is sometimes impeded by the magnet and the use of two reset levers and four dogs eliminates "blind spots" or failure of a resetting operation thereby producing an almost "foolproof" reset as well as a faster operation thereof.

What I claim is:

1. A clutch comprising a driving member, a driven member, inertia means associated with said driving member and capable of rotation relative thereto, a pair of spring-pressed pawls rotatably mounted in said driving member, a pin on each pawl for connecting same to said inertia means, dogs on said driven member engageable with said pawls, said inertia means rotating said pawls when said driven member is stopped by a shock load, thus permitting said pawls to become disengaged from said dogs, a magnet armature carried by said inertia means, a magnet; and reset means supporting said magnet for engagement with said armature thereby bringing said reset lever into engagement with said dogs for causing the driven member to rotate said inertia means and pawls relative to said driving member for re-engaging said pawls and said dogs.

2. A clutch comprising a driving member, a driven member concentrically disposed with respect to said driving member, inertia means supported on said driving member and capable of rotation relative thereto, a pair of pawls rotatably mounted in said driving member, dogs on said driven member engageable with said pawls, a pin slidably mounted on each pawl and secured to said inertia means, said inertia means rotating said pawls after it rotates relative to said driving member, a reset lever pivoted to said driving member, a magnet on said member; and an armature supported on said inertia means and engageable with said magnet, a dog on said driven member engaging said reset lever and causing said inertia means to be reversely rotated by said driving member to thereby engage the pawls on said driving member with the dogs on said driven member.

3. A clutch comprising a driven member, a pair of dogs on said driven member, a driving member, a pair of pawls rotatably mounted in said driving member and each having a surface thereon engageable with the arms on said driven member, a pair of inertia members disposed on opposite sides of said driving member and rotatable relative thereto, a spring for each pawl, a pin slidably mounted on each pawl and in engagement with said inertia means, said springs maintaining said pawls in either of two adjusted positions and completing motion of the pawls after motion is initiated by the interia means, said inertia means rotating said pawls relative to the driving member when said driven member encounters a shock load to thereby enable said dogs to be disengaged from said pawls, a magnet, reset means pivotally mounted on said driving member and mounting said magnet; and an armature for said magnet secured to said inertia means, said magnet holding the pivoted reset means in the path of one of the dogs on the driven member thereby causing the driving member after a reduction in its speed to rotate the inertia means to rotate said pawls for re-engaging said dogs and said pawls.

4. A clutch comprising a driving member, a driven member, inertia means mounted on said driving member and rotatable relative thereto when a shock load is applied to the driven member, dogs on said driven member, pawls rotatably mounted in said driving member and engageable with said dogs, a pin slidably mounted on each of said pawls and supported in said inertia means, a spring on each pawl that is energized during the first portion of the relative rotation of said inertia means and said driving member and completing the motion in the second portion of each such relative movement, a reset lever pivoted to said driving member, a magnet on said member; and an armature supported by said inertia means engageable with said magnet, said reset lever moved radially inward of said driving member upon a suitable reduction in speed of the driving member to permit engagement of magnet and armature thereby permitting said reset lever to engage one of said dogs to relatively rotate inertia means and driving member thus causing said dogs and pawls to re-engage.

5. A clutch comprising a driven member, a driving member, inertia means mounted for rotation on said driving member and for rotation relative thereto when a shock load is imposed on the clutch, pawls rotatably mounted in said driving member, dogs on said driven member engageable with said pawls, a pin on each pawl for connecting same to said inertia means for movement therewith, a spring on each pawl, the spring energized during the first portion of pawl movement and being de-energized during the latter portion of pawl movement, a reset lever pivotally mounted to said driving member, a magnet carried thereby; and an armature for said magnet secured to the inertia means, said magnet engaging said armature after the speed of the driving member has been reduced thereby permitting the reset lever to swing radially inward in order that the dogs on said driven member engage said reset lever thus causing the driving member to relatively rotate said inertia means and said driving member for rotating said pawls to thereby cause re-engagement of said dogs and pawls.

6. A clutch comprising a driving member, a plurality of pawls rotatably mounted therein, each provided with a contact surface, a driven member, a plurality of dogs on said driven member engageable with the contact surfaces on said pawls, inertia means mounted on said driving member for rotation therewith or relative thereto, means connecting each pawl with said inertia device, the pawls rotating relative to the driving member when the inertia means is rotated relative thereto, a resetting lever pivoted to said driving member, means for connecting said lever to said inertia means so that one of said dogs may contact said reset lever to thereby cause the pawls and inertia device to be rotated relative to said driving member for bringing said dogs and contact surfaces into re-engagement.

7. A clutch comprising a driving member, a driven member, inertia means mounted on said driven member for rotation therewith or relative thereto, spring operated pawls rotatably mounted in said driving member, means for connecting said pawls to said inertia means, dogs on said driven member engageable with said pawls, the pawls disengaging from said dogs when the inertia means rotates relative to said driving member, reset lever means for said clutch pivoted to said driving member; means connected to said inertia means engageable with said reset lever for causing said driving member to rotate said inertia means relative to said driving member to thereby re-engage said pawls and said dogs.

8. A clutch comprising a driving member, a pair of pawls rotatably mounted therein, a driven member, dogs on said driven member engageable with said pawls, inertia means mounted on said driving member for rotation therewith or relative thereto, means connecting each pawl with said inertia means so that the pawls may be rotated relative to the driving member for disengaging said pawls and dogs, springs on said pawls to be energized during part of said relative rotation and completing the rotation during another part thereof, reset lever means pivoted to said driving member; and means for associating said reset lever means with inertia means after the rate of rotation of the driving member has been reduced a pre-determined amount causing the driving means to rotate said inertia means relative thereto, the dogs re-engaging said pawl means following this relative rotation of the inertia and driving means.

9. A clutch comprising a driving member, a driven member, an inertia means rotatable with said driving member and capable of rotation relative thereto, a pair of diametrically disposed pawls rotatably mounted in said driving member, means for connecting each pawl with said inertia means, the pawls being rotated relative to the driving member when the inertia means rotates relative thereto, a spring associated with each pawl that is energized during the first half of the relative motion and de-energizes during the latter half of the relative movement, a plurality of dogs on said driven member, a pair of reset levers pivoted to said driving member, means for associating the reset levers with said inertia means so that the dogs may contact said levers thereby permitting said driving member to rotate the pawls and inertia device relative to said driving members so that pawls and dogs may re-engage; and stop means for limiting the relative motion of said driving member and said reset levers.

10. A clutch comprising a driving member, a driven member, inertia means associated with said driving member and capable of rotation relative thereto, a pair of spring-pressed pawls rotatably mounted in said driving member, a pin on each pawl for connecting same to said inertia means, dogs on said driven member engageable with said pawls, said inertia means rotating said pawls when said driven member is stopped by a shock load, thus permitting said pawls to become disengaged from said dogs, a magnet armature carried by said inertia means, a magnet; a reset lever pivotally mounted on said driving member and having notches cut on one side thereof supporting said magnet for engagement with said armature thereby bringing said reset lever into engagement with said dogs for causing the driven member to rotate said inertia means and pawls relative to said driving member for re-engaging said pawls and said dogs; and a stop member on said driving member engageable by one of the notches of said reset lever when it is swung outwardly by centrifugal action.

11. A clutch comprising a driving member, a driven member concentrically disposed with respect to said driving member, inertia means supported on said driving member and capable of rotation relative thereto, a pair of pawls rotatably mounted in said driving member, dogs on said driven member engageable with said pawls, a pin slidably mounted on each pawl and secured to said inertia means, said inertia means rotating said pawls after it rotates relative to said driving member, a reset lever pivoted to said driving member and having notches cut in one edge thereof, a magnet on said member; an armature supported on said inertia means and engageable with said magnet, a dog on said driven member engaging said reset lever and causing said inertia means to be reversely rotated by said driving member to thereby engage the pawls on said driving member with the dogs on said driven member; and a stop member engageable with one of the notches in said reset lever for limiting the outward motion thereof.

12. A clutch comprising a driving member, a driven member, an inertia means rotatable with said driving member and capable of rotation relative thereto, a pair of diametrically disposed pawls rotatably mounted in said driving member, means for connecting each pawl with said inertia means, the pawls being rotated relative to the driving member when the inertia means rotates relative thereto, a spring associated with each pawl that is energized during the first half of the relative motion and de-energizes during the latter half of the relative movement, a plurality of dogs on said driven member, a pair of reset levers pivoted to said driving member, each lever having a pointed end mass disposed to one side of the pivot points, means for associating the reset levers with said inertia means so that the dogs may contact said levers thereby permitting said driving member to rotate the pawls and inertia device relative to said driving members so that pawls and dogs may re-engage; and stop means for limiting the relative motion of said driving member and said reset levers.

13. A clutch comprising a driving member, a driven member, a plurality of dogs on said driven member, a pair of diametrically disposed pawls rotatably mounted in said driving member, each pawl having a dog contacting surface thereon, the plane of whose surfaces is displaced radially outward from the axis of rotation of said pawls, an inertia disc mounted on each side of said driving member for rotation therewith or relative thereto, a pin on each pawl connected to said inertia discs, a spring on each pawl, the inertia discs rotating said pawls when the driven member encounters a shock load to thereby permit said dogs to clear said pawl surfaces so that said driving member may rotate relative to said driven member, a pair of reset levers pivoted to said driving member and disposed on opposite sides thereof, each lever having a pointed end and a weighted portion disposed to one side of the pivot for each reset lever, a bar connected between said inertia discs engageable with one of said reset levers; and stop means for limiting the radial outward motion of each lever, said reset levers moving radially inwardly following a suitable reduction of speed of the driving member, permitting the pointed end thereof to engage one of said dogs and one of said bars so that said driving member will rotate said inertia means relative to said driving member to thereby permit some of said dogs to re-engage the dog engaging surfaces on said pawls.

References Cited in the file of this patent

UNITED STATES PATENTS

| 1,125,646 | Campbell | Jan. 19, 1915 |
| 1,605,128 | McGrath | Nov. 2, 1926 |
| 2,706,546 | Thomson | Apr. 19, 1955 |

FOREIGN PATENTS

| 18,316 of 1914 | Great Britain | Feb. 16, 1915 |
| 219,975 | Great Britain | July 25, 1924 |